United States Patent
Konno et al.

(10) Patent No.: US 10,280,264 B2
(45) Date of Patent: May 7, 2019

(54) METHOD FOR MANUFACTURING FINE POLYARYLENE SULFIDE POWDER, AND FINE POLYARYLENE SULFIDE POWDER

(71) Applicant: Kureha Corporation, Tokyo (JP)

(72) Inventors: Akihiro Konno, Tokyo (JP); Hiroyuki Sato, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 30 days.

(21) Appl. No.: 15/559,188

(22) PCT Filed: Mar. 31, 2016

(86) PCT No.: PCT/JP2016/060656
§ 371 (c)(1),
(2) Date: Sep. 18, 2017

(87) PCT Pub. No.: WO2016/159234
PCT Pub. Date: Oct. 6, 2016

(65) Prior Publication Data
US 2018/0112042 A1    Apr. 26, 2018

(30) Foreign Application Priority Data

Mar. 31, 2015   (JP) ................. 2015-071157

(51) Int. Cl.
| | | |
|---|---|---|
| *C08J 3/12* | (2006.01) | |
| *C08G 75/02* | (2016.01) | |
| *C08G 75/0213* | (2016.01) | |
| *C08G 75/0254* | (2016.01) | |
| *C08G 75/0259* | (2016.01) | |
| *C08G 75/0277* | (2016.01) | |
| *C08G 75/0281* | (2016.01) | |

(52) U.S. Cl.
CPC ......... *C08G 75/0277* (2013.01); *C08G 75/02* (2013.01); *C08G 75/0213* (2013.01); *C08G 75/0254* (2013.01); *C08G 75/0259* (2013.01); *C08G 75/0281* (2013.01); *C08J 3/12* (2013.01)

(58) Field of Classification Search
CPC ........ C08J 3/12; C08G 75/0281; C08G 75/02; C08G 75/0259; C08G 75/0213; C08G 75/0254; C08G 75/0277
See application file for complete search history.

(56) References Cited

U.S. PATENT DOCUMENTS

| | | |
|---|---|---|
| 4,730,034 A | 3/1988 | Nesheiwat et al. |
| 4,748,231 A | 5/1988 | Nesheiwat |
| 2015/0065664 A1 | 3/2015 | Konno et al. |

FOREIGN PATENT DOCUMENTS

| | | |
|---|---|---|
| JP | S63215728 A | 9/1988 |
| JP | H0593068 A | 4/1993 |
| JP | 2007002172 A | 1/2007 |
| JP | 2007016142 A | 1/2007 |
| JP | 2009227972 A | 10/2009 |
| WO | WO2013147141 A1 | 10/2013 |

OTHER PUBLICATIONS

International Search Report of PCT/JP2016/060656 dated Jul. 5, 2016.
Office Action issued in the KR Patent Application No. KR10-2017-7021868, dated Nov. 18, 2018, 9 pgs.

*Primary Examiner* — Shane Fang
(74) *Attorney, Agent, or Firm* — Abel Schillinger, LLP

(57) ABSTRACT

Provided is a method for manufacturing fine polyarylene sulfide (PAS) powder, in which impurities such as alkali metal salts and/or PAS oligomers are reduced while the wettability of the fine PAS powder in a fine PAS powder-containing solid is retained after solid-liquid separation of a separation liquid obtained by subjecting a dispersion liquid containing granular PAS to separation into granular PAS and a separation liquid; and a fine PAS powder.

The method for manufacturing a fine PAS powder of the present invention includes: (a) separating granular PAS and a separation liquid from a dispersion liquid containing granular PAS, by solid-liquid separation using at least one screen that has an opening diameter of 75 to 180 μm; (b) performing solid-liquid separation of the separation liquid to obtain a fine PAS powder-containing solid; (c) heating the fine PAS powder-containing solid to reduce an amount of an organic solvent to obtain a wet cake; and (d) washing the wet cake using an aqueous solvent. The water content of the wet cake after heating is at least 30 wt. %.

6 Claims, No Drawings

METHOD FOR MANUFACTURING FINE POLYARYLENE SULFIDE POWDER, AND FINE POLYARYLENE SULFIDE POWDER

TECHNICAL FIELD

The present invention relates to a manufacturing method for manufacturing a fine polyarylene sulfide powder from a dispersion liquid containing a granular polyarylene sulfide, and a fine polyarylene sulfide powder.

BACKGROUND ART

Polyarylene sulfides (also may be abbreviated as "PAS" hereafter) such as polyphenylene sulfides (also may be abbreviated as "PPS" hereafter) are engineering plastics having excellent heat resistance, chemical resistance, flame retardant properties, mechanical strength, electrical properties, dimensional stability, and the like. PAS is widely used in a range of technical fields including those of electrical instruments, electronic instruments, automobile instruments and packaging materials, because PAS can be formed into various molded products, films, sheet, fibers, and the like by general melting processing methods such as extrusion molding, injection molding and compression molding.

A typical manufacturing method for PAS includes performing a polymerization reaction of a dihalo aromatic compound (hereinafter sometimes referred to as "DHA") such as paradichlorobenzene (hereinafter sometimes referred to as "pDCB") with a sulfur compound such as alkali metal sulfide or alkali metal hydrosulfide as the sulfur source, in an organic amide solvent such as N-methyl-2-pyrrolidone (hereinafter sometimes referred to as "NMP") under heated condition to obtain a PAS-containing reaction solution, subsequently separating PAS from the PAS-containing reaction solution and recovering PAS by washing and drying.

This polymerization reaction is a desalting polycondensation reaction, wherein, in addition to the reactant PAS, by-product alkali metal salts such as alkali metal halides (e.g. NaCl), low polymers such as dimers, and trimers, and impurities (volatile substances and substances with a high boiling point, and the like) are also produced. For this reason, these organic amide solvents, byproduct alkali metal salts, low polymers, and impurities may be present either between or inside PAS particles, or in the reaction solution after the polymerization reaction. Accordingly, PAS separated from the PAS-containing reaction solution is recovered after washing thoroughly to remove the organic amide solvent, byproduct alkali metal salts, low polymers, and impurities, thereby improving and maintaining the quality of the PAS used as product.

At the same time, the separation liquid from which PAS was separated via solid-liquid separation of the PAS-containing reaction solution, contains microscopic particulate form PAS (hereinafter sometimes referred to as "raw material fine PAS powder"). However, this raw material fine PAS powder is not as good as the PAS product from a quality perspective (molecular weight, color, smell, gas generation, and the like), and as a result, it is not recovered as a product, but is disposed of. In order to comply with environmental criteria during disposal, raw material fine PAS powder is disposed at present as follows: raw material fine PAS powder is recovered from the separation liquid by solid-liquid separation using filtration, and the like, and the organic amide solvent, byproduct alkali metal salts, low polymers, and impurities are removed from between and in the fine particles of raw material fine PAS powder by washing, then the raw material fine PAS powder is disposed after confirming compliance with environmental criteria (for example, landfill or incineration).

Furthermore, even if raw material fine PAS powder is offered as a product, it has little value in industrial use, and causes few problems upon disposal, due to its small scale of production (hereinafter, where raw material fine PAS powder is recovered and offered as a product, the quantity of the product is sometimes referred to as the "productization yield").

However, around 30 years have now passed since PAS first entered the market, and along with demands for quality, the market has also come to demand cost reductions, and these demands have been increasing each year. For that reason, there has been a general review of the steps by which PAS is manufactured.

Against this background, from the perspectives of reducing PAS costs and responding to environmental problems, studies for recovery of raw material fine PAS powder as a product, which has been recovered from the separation liquid and disposed of in the past, has been conduced.

In Patent Document 1, specifically, a method is proposed in which, particulate polymer is separated using a 60 mesh screen, after polymerization for 3.0 hours at a reaction temperature of 260° C., and a PAS oligomer is coagulated by adding water to the mixture containing PAS oligomer and solvent after removal of NaCl from the separation liquid, then the PAS oligomer is separated by centrifugal separation.

In this case, 60 mesh has an aperture of 250 μm, so oligomer with a particle size of 250 μm or smaller is selected. In other words, in Patent Document 1, possibly as a result of the polymerization method, PAS polymer with a particle size of 250 μm or greater is selected as a product, and separated from PAS oligomer with a particle size of 250 μm or smaller.

In Patent Document 2, a method is proposed in which, using a phase separation agent, a slurry containing granular PAS, PAS oligomer, organic polar solvent, water, and halogenated alkali metal salt is obtained via polymerization, and the PAS oligomer is separated from the slurry. Specifically, an 80 mesh (175 μm) sieve is used to separate granular PAS, after which a glass filter of aperture 10 to 16 μm is used to separate the PAS oligomer. In this case, the PAS oligomer selected has a distribution ranging from a minimum particle size of from 10 to 16 μm to a maximum particle size of 175 μm.

In Patent Document 3, a manufacturing method for PAS resin is proposed wherein the PAS oligomer obtained using the method in Patent Document 2 is subjected to thermal oxidation in an oxidizing gas atmosphere at from 150 to 260° C., in order to reduce volatile substances.

However, these citations do not specifically disclose the problems associated with recovery of raw material fine PAS powder for use as product from separation liquid, or any problems with quality when compared to that of a regular product.

CITATION LIST

Patent Literature

Patent Document 1: JP-A-5-093068
Patent Document 2: JP-A-2007-002172
Patent Document 3: JP-A-2007-016142

SUMMARY OF INVENTION

Technical Problem

The inventors of the present invention focused on the production of raw material fine PAS powder recovered as a solid via solid-liquid separation by filtration and the like of the separation liquid, which is produced by the solid-liquid separation of the PAS-containing reaction solution, in order to meet the market demand for reduced costs and improved environmental impact.

The inventors of the present invention considered the main factors impeding the recovery of raw material fine PAS powder as product, when compared to granular PAS product, to be (i) the high proportion of low polymer, which is easily degraded by heat, (ii) the microscopic particulate substance (hereinafter sometimes referred to as "fine powder"), and further, (iii) the fact that the heat treatment aimed at modification such as reduction of volatile substances does not function as intended.

In other words, PAS polymeric substances are known to have different levels of thermal stability depending on its molecular weight; the lower the polymer, the greater in its tendency to degrade easily by heat in comparison with substances with a high molecular weight, and the larger content of low polymers in raw material fine PAS powder is problematic.

Furthermore, the low polymer included in raw material fine PAS powder forms a part of a fine powder, which is a microscopic particulate form substance, and is not easily removed by washing. Because it is a fine powder, the effect of washing is not easily achieved, thus the organic amide solvent, byproduct alkali metal salts, and impurities (volatile substances and substances with high boiling point) are present between and within the fine powder particles. This is believed to have a significant impact on the quality of raw material fine PAS powder when it is produced.

The present inventors found that wettability of a fine PAS powder significantly decreases when a fine PAS powder-containing solid is heated and dried in order to reduce the amount of an organic solvent in the fine PAS powder-containing solid after solid-liquid separation, such as filtration, of a separation liquid, which is obtained by subjecting a dispersion liquid containing granular PAS to separation into granular PAS and a separation liquid upon production of the fine PAS powder in such circumstances. Therefore, it was found that, even when the fine PAS powder is subjected to washing by an aqueous solvent, impurities such as alkali metal salts and PAS oligomers remained in or between the fine powder are less likely to be removed by the washing because infiltration of the aqueous solvent into or in between the powder is inhibited.

The present inventors found that, by adjusting a water content after the heating, a time for adding water, a retention rate of a specific surface area of the fine PAS powder before and after the heating, or a temperature during the heating, the impurities such as alkali metal salts and PAS oligomers can be removed from the fine PAS powder while the wettability of the fine PAS powder is maintained, and thus thought of and achieved the present invention.

An object of the present invention is to provide a method for manufacturing fine PAS powder, in which impurities such as alkali metal salts and/or PAS oligomers are reduced while the wettability of the fine PAS powder in a fine PAS powder-containing solid is retained after solid-liquid separation of a separation liquid obtained by subjecting a dispersion liquid containing granular PAS to separation into granular PAS and a separation liquid; and a fine PAS powder.

Solution to Problem

Therefore, according to the present invention, a method for manufacturing a fine polyarylene sulfide powder is provided. The method includes:
(a) separating granular polyarylene sulfide and a separation liquid from a dispersion liquid containing granular polyarylene sulfide by solid-liquid separation using at least one screen having an opening diameter in a range of from 75 to 180 μm;
(b) performing solid-liquid separation of the separation liquid, to obtain a fine polyarylene sulfide powder-containing solid;
(c) heating the fine polyarylene sulfide powder-containing solid to reduce an amount of an organic solvent and to obtain a wet cake; and
(d) washing the wet cake using an aqueous solvent;
wherein a water content of the wet cake after heating is 30 wt. % or greater.

According to the present invention, a method for manufacturing a fine polyarylene sulfide powder is further provided. The method includes:
(a) separating granular polyarylene sulfide and a separation liquid from a dispersion liquid containing granular polyarylene sulfide, by solid-liquid separation using at least one screen having an opening diameter in a range of from 75 to 180 μm;
(b) performing solid-liquid separation of the separation liquid to obtain a fine polyarylene sulfide powder-containing solid;
(c) heating the fine polyarylene sulfide powder-containing solid to reduce an amount of an organic solvent and to obtain a wet cake; and
(d) washing the wet cake using an aqueous solvent; the method further comprising adding water to the separation liquid, in which water is added to the separation liquid, after separating but before heating.

Furthermore, according to the present invention, another method for manufacturing a fine polyarylene sulfide powder is provided. The method includes:
(a) separating granular polyarylene sulfide and a separation liquid from a dispersion liquid containing granular polyarylene sulfide by solid-liquid separation using at least one screen having an opening diameter in a range of from 75 to 180 μm;
(b) performing solid-liquid separation of the separation liquid, to obtain a fine polyarylene sulfide powder-containing solid;
(c) heating the fine polyarylene sulfide powder-containing solid to reduce an amount of an organic solvent and to obtain a wet cake; and
(d) washing the wet cake using an aqueous solvent; wherein a specific surface area retention A2/A1 is 20% or greater, A1 being a specific surface area of the fine polyarylene sulfide powder contained in the fine polyarylene sulfide powder-containing solid before heating and A2 being a specific surface area of the fine polyarylene sulfide powder contained in the wet cake after heating.

Furthermore, according to the present invention, another method for manufacturing a fine polyarylene sulfide powder is provided. The method includes:
(a) separating granular polyarylene sulfide and a separation liquid from a dispersion liquid containing granular polyarylene sulfide by solid-liquid separation using at least one screen having an opening diameter in a range of from 75 to 180 µm;
(b) performing solid-liquid separation of the separation liquid, to obtain a fine polyarylene sulfide powder-containing solid;
(c) heating the fine polyarylene sulfide powder-containing solid to reduce an amount of an organic solvent and to obtain a wet cake; and
(d) washing the wet cake using an aqueous solvent; wherein a heating temperature in heating is 85° C. or lower in average.

Furthermore, according to the present invention, a fine polyarylene sulfide powder produced by the manufacturing method according to the present invention is also provided.

Furthermore, according to the present invention, a fine polyarylene sulfide powder,
an average particle size of the fine polyarylene sulfide powder being from 1 to 200 µm, and a melt viscosity of the fine polyarylene sulfide powder being 1 Pa·s or greater, is also provided.

Advantageous Effects of Invention

According to the present invention, a method for manufacturing fine PAS powder, in which impurities such as alkali metal salts and/or PAS oligomers are reduced while the wettability of the fine PAS powder in a fine PAS powder-containing solid is retained after solid-liquid separation of a separation liquid obtained by separation of a dispersion liquid containing granular PAS into granular PAS and a separation liquid; thus, a fine PAS powder is provided.

DESCRIPTION OF EMBODIMENTS

In the first embodiment, the method for manufacturing a fine polyarylene sulfide powder according to the present invention includes:
(a) separating granular polyarylene sulfide and a separation liquid from a dispersion liquid containing granular polyarylene sulfide by solid-liquid separation using at least one screen having an opening diameter in a range of from 75 to 180 µm;
(b) performing solid-liquid separation of the separation liquid, to obtain a fine polyarylene sulfide powder-containing solid;
(c) heating the fine polyarylene sulfide powder-containing solid to reduce an amount of an organic solvent and to obtain a wet cake; and
(d) washing the wet cake using an aqueous solvent;
wherein a water content of the wet cake after heating is 30 wt. % or greater.

In the second embodiment, the method for manufacturing a fine polyarylene sulfide powder according to the present invention includes:
(a) separating granular polyarylene sulfide and a separation liquid from a dispersion liquid containing granular polyarylene sulfide, by solid-liquid separation using at least one screen having an opening diameter in a range of from 75 to 180 µm;
(b) performing solid-liquid separation of the separation liquid to obtain a fine polyarylene sulfide powder-containing solid;
(c) heating the fine polyarylene sulfide powder-containing solid to reduce an amount of an organic solvent and to obtain a wet cake; and
(d) washing the wet cake using an aqueous solvent;
the method further comprising adding water to the separation liquid, in which water is added to the separation liquid, after separating but before heating.

In the third embodiment, the method for manufacturing a fine polyarylene sulfide powder according to the present invention includes:
(a) separating granular polyarylene sulfide and a separation liquid from a dispersion liquid containing granular polyarylene sulfide by solid-liquid separation using at least one screen having an opening diameter in a range of from 75 to 180 µm;
(b) performing solid-liquid separation of the separation liquid, to obtain a fine polyarylene sulfide powder-containing solid;
(c) heating the fine polyarylene sulfide powder-containing solid to reduce an amount of an organic solvent and to obtain a wet cake; and
(d) washing the wet cake using an aqueous solvent;
wherein a specific surface area retention $A2/A1$ is 20% or greater, $A1$ being a specific surface area of the fine polyarylene sulfide powder contained in the fine polyarylene sulfide powder-containing solid before heating and $A2$ being a specific surface area of the fine polyarylene sulfide powder contained in the wet cake after heating.

In the fourth embodiment, the method for manufacturing a fine polyarylene sulfide powder according to the present invention includes:
(a) separating granular polyarylene sulfide and a separation liquid from a dispersion liquid containing granular polyarylene sulfide by solid-liquid separation using at least one screen having an opening diameter in a range of from 75 to 180 µm;
(b) performing solid-liquid separation of the separation liquid, to obtain a fine polyarylene sulfide powder-containing solid;
(c) heating the fine polyarylene sulfide powder-containing solid to reduce an amount of an organic solvent and to obtain a wet cake; and
(d) washing the wet cake using an aqueous solvent;
wherein a heating temperature in heating is 85° C. or lower in average.

The manufacturing method for manufacturing the fine PAS powder of the present invention is a manufacturing method always including (a) separating granular polyarylene sulfide and a separation liquid (separation step), (b) performing solid-liquid separation of the separation liquid (solid-liquid separation step), and (c) heating the fine polyarylene sulfide powder-containing solid described above (liquid removing step); and, as necessary, other steps, such as a step to concentrate or dilute the reaction solution and/or separation liquid, washing (washing step), and drying (drying step) may be added, or one or multiple steps of (a) to (c), and particularly one or both steps (b) and (e) may be additionally performed.

The dispersion liquid containing the granular PAS is not particularly limited, and may be any dispersion liquid as long as the granular PAS is contained. Examples thereof include a reaction solution containing granular PAS produced by a polymerization step in which polymerization reaction is carried out with at least one type of sulfur source selected from the group consisting of alkali metal sulfides and alkali metal hydrosulfides and a dihalo aromatic compound in an organic amide solvent. Hereinafter, first, the production of the granular PAS is described in I. and II. below.

I. Polymerization reaction components

1. Sulfur Source

At least one type of sulfur source selected from the group consisting of alkali metal sulfides and alkali metal hydrosulfides is used as the sulfur source. Examples of the alkali metal sulfide include lithium sulfide, sodium sulfide, potassium sulfide, rubidium sulfide, cesium sulfide, and a mixture of two or more of these. Examples of the alkali metal hydrosulfide include lithium hydrosulfide, sodium hydrosulfide, potassium hydrosulfide, rubidium hydrosulfide, cesium hydrosulfide, and a mixture of two or more of these.

The alkali metal sulfide may be in the form of an anhydride, hydrate or aqueous solution. Among these, sodium sulfide and lithium sulfide are preferable from the perspective of being readily available industrially at a low price. It is preferable for the alkali metal sulfide to be an aqueous mixture such as a solution (in other words, a fluid mixture including water), from the point of view of ease of processing and weighing.

The alkali metal hydrosulfide may be used in the form of anhydrate, hydrate, or aqueous solution. Among these, sodium hydrosulfide and lithium hydrosulfide are preferable from the perspective of being readily available industrially at a low price. It is preferable for the alkali metal hydrosulfide to be an aqueous mixture such as a solution (in other words, a fluid mixture including water), from the point of view of ease of processing and weighing.

A small amount of alkali metal hydrosulfide may be contained in the alkali metal sulfide. In this case, the total mol amount of the alkali metal sulfide and alkali metal hydrosulfide is that of the sulfur source supplied to the polymerization reaction in the polymerization step after the dehydration step is carried out where necessary, in other words the "charged sulfur source".

A small amount of alkali metal sulfide may be contained in the alkali metal hydrosulfide. In this case, the total mol amount of the alkali metal hydrosulfide and alkali metal sulfide is the charged sulfur source. If the alkali metal sulfide and alkali metal hydrosulfide are mixed and used, then naturally, the mixture of the two will be the charged sulfur source.

When the sulfur source contains an alkali metal hydrosulfide, an alkali metal hydroxide is used in combination. Examples of the alkali metal hydroxide include lithium hydroxide, sodium hydroxide, potassium hydroxide, rubidium hydroxide, cesium hydroxide, and a mixture of two or more of these. Of these, sodium hydroxide and lithium hydroxide are preferred from the perspective of being available at low cost for industrial purposes. The alkali metal hydroxide is preferably used as an aqueous solution or an aqueous mixture.

In the PAS manufacturing method, the water content that should be removed by the dehydration step is hydrated water, an aqueous medium of an aqueous solution, water that is the byproduct of the reaction between an alkali metal hydrosulfide and an alkali metal hydroxide, and the like.

2. Dihalo Aromatic Compound

A dihalo aromatic compound (DHA) is a dihalogenated aromatic compound having two halogen atoms bonded directly to an aromatic ring. Halogen atoms include fluorine, chlorine, bromine, and iodine atoms, and in the same dihalo aromatic compound, two halogen atoms may be the same or different. These dihalo aromatic compounds may be used alone or in a combination of two or more types. Specific examples of the dihalo aromatic compounds include o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide, dihalodiphenyl ketone, or the like. Of these, p-dihalobenzene, m-dihalobenzene or a mixture of these two is preferred, p-dihalobenzene is more preferred, and p-dichlorobenzene (pDCB) is particularly preferred.

3. Branching/Cross-linking Agent

In order to introduce a branched or crosslinked structure into the produced PAS, a polyhalo compound (not necessarily an aromatic compound) to which three or more halogen atoms are bonded, an active hydrogen-containing halogenated aromatic compound, a halogenated nitro aromatic compound, or the like may be used in combination. Preferable examples of the polyhalo compound as a branching/crosslinking agent include trihalobenzene. Furthermore, it is possible to use a monohalo compound in combination in order to form a specific structure at an end of the produced PAS resin, or to adjust the polymerization reaction or molecular weight.

The monohalo compound may be, in addition to a monohalo aromatic compound, a monohalo aliphatic compound.

The branching/cross-linking agent may be used in the range of from 0.0001 to 0.01 mol per 1 mol charged sulfur source, preferably from 0.0002 to 0.008 mol, and more preferably from 0.0003 to 0.005 mol.

4. Organic Amide Solvent

An organic amide solvent that is an aprotonic polar organic solvent is used as a solvent for dehydration reaction and polymerization reaction. The organic amide solvent is preferably stable against alkali at high temperatures. Specific examples of the organic amide solvent include amide compounds, such as N,N-dimethylformamide and N,N-dimethylacetamide; N-alkylcaprolactam compounds, such as N-methyl-ε-caprolactam; N-alkylpyrrolidone compounds or N-cycloalkylpyrrolidone compounds, such as N-methyl-2-pyrrolidone and N-cyclohexyl-2-pyrrolidone; N,N-dialkylimidazolidinone compounds, such as 1,3-dialkyl-2-imidazolidinone; tetraalkyl urea compounds, such as tetramethyl urea; and hexaalkylphosphoric triamide compounds, such as hexamethylphosphoric triamide. These organic amide solvents may be used alone, or in a combination of two or more types.

Of these organic amide solvents, N-alkyl pyrrolidone compounds, N-cycloalkyl pyrrolidone compounds, N-alkyl caprolactam compounds, and N,N-dialkyl imidazolidinone compounds are preferred; in particular, N-methyl-2-pyrrolidone (NMP), N-methyl-ε-caprolactam, and 1,3-dialkyl-2-imidazolidinone are more preferred, and NMP is most preferred.

5. Polymerization Aid

Where required, to promote the polymerization reaction, various types of polymerization aid may be used. Specific examples of the polymerization aids include well-known typical polymerization aids for PAS including water, organic carboxylic acid metal salt, organic sulfonic acid metal salt, alkali metal halides such as halogenated lithium, alkaline earth metal halide, alkaline earth metal salt of aromatic carboxylic acid, phosphoric acid alkali metal salt, alcohols, paraffin hydrocarbons, or a mixture of two or more of these. An alkali metal carboxylate is preferred as the organic carboxylic acid metal salt. Examples of the alkali metal carboxylate include lithium acetate, sodium acetate, potassium acetate, sodium propionate, lithium valerate, lithium benzoate, sodium benzoate, sodium phenyl acetate, potassium p-tolulate, or a mixture of two or more of these. Sodium acetate is particularly preferred as an alkali metal carboxylate due to the low cost of obtaining it. The amount of polymerization aid used depends on the type of compound, but is typically in the range of from 0.01 to 10 mol, preferably from 0.1 to 2 mol, more preferably from 0.2 to 1.8 mol, and particularly preferably from 0.3 to 1.7 mol, per 1 mol of charged sulfur source.

When the polymerization aid is an organic carboxylic metal salt, organic sulfonate, or alkali metal halide, the upper limit for use is preferably 1 mol or less, and more preferably 0.8 mol or less per 1 mol of charged sulfur source.

6. Phase Separation Agent

Various phase separation agents may be used in order to accelerate the polymerization reaction and achieve a high degree of polymerization in PAS in a short period of time, or to cause phase separation and obtain granular PAS. Phase separation agents are compounds that dissolve in an organic amide solvent either on their own or in the presence of a small amount of water, and reduce the solubility of PAS in an organic amide solvent. The phase separation agent itself is a compound that is not a PAS solvent.

Any compound known to function as a phase separation agent in the general technical field of PAS may be used as the phase separation agent. Phase separation agents include the compounds used as the abovementioned polymerization aid, but here, "phase separation agent" indicates a compound that can be used in the quantitative ratio that allows it to function as a phase separation agent in a step that performs a polymerization reaction in a phase-separated state, in other words a phase-separated polymerization step, or in the quantitative ratio sufficient to cause phase separation in the presence of the phase separation agent after the completion of polymerization. Specific examples of phase separation agent include water, organic carboxylic acid metal salt, organic sulfonic acid metal salt, alkali metal halides such as halogenated lithium, alkaline earth metal halide, alkaline earth metal salt of aromatic carboxylic acid, phosphoric acid alkali metal salt, alcohol, paraffin hydrocarbons, and the like. Preferred examples of organic carboxylic acid metal salt include lithium acetate, sodium acetate, potassium acetate, sodium propionate, lithium valerate, lithium benzoate, sodium benzoate, sodium phenyl acetate, potassium p-tolulate, and other alkali metal carboxylate. These phase separation agents may be used alone, or in a combination of two or more types. Of these phase separation agents, either water, which is inexpensive to obtain and easy to postprocess, or a mixture of water and an organic carboxylic acid metal salt such as alkali metal carboxylate is particularly preferred.

Even if water is used as the phase separation agent, it is possible to use a phase separation agent other than water as a polymerization aid in combination, from the perspective of performing phase-separated polymerization efficiently. When both water and another phase separation agent are used together during the phase-separated polymerization step, the total amount thereof may be any amount that induces phase separation. At least a part of the phase separation agent may be included during charging of the polymerization reaction component, but it is preferable to add the phase separation agent during the polymerization reaction, or to adjust the amount of the phase separation agent to an amount sufficient to form phase separation after the polymerization reaction.

II. Polymerization Step

The manufacture of PAS includes the production of granular PAS via polymerization reaction between at least one sulfur source selected from the group consisting of an alkali metal sulfide and an alkali metal hydrosulfide and a dihalo aromatic compound in organic amide solvent.

Any polymerization method may be used for the manufacture of granular PAS in the present invention, providing that it does not impart the present invention.

In general, polymerization methods for manufacturing granular PAS can be broadly classified into (i) methods wherein the polymerization step includes a phase-separated polymerization step, and after phase-separated polymerization, gradual cooling is carried out, (ii) methods wherein a phase separation agent is added after the polymerization reaction, and gradual cooling is carried out, (iii) methods using a polymerization aid such as lithium chloride, (iv) methods wherein the gas phase portion in the reactor is cooled, and the like.

Of these, because when granular PAS is manufactured using a polymerization method including a polymerization reaction step carried out under phase-separated conditions, wherein polymerization conditions are controlled, and a concentrated polymer phase and a diluted polymer phase are present in the polymerization reaction system in the presence of a phase separation agent (hereinafter sometimes referred to as a "phase-separated polymerization step"), granular PAS with a high degree of polymerization can be obtained. Thus, it is possible to use a sieve screen with a small aperture size. This is an effective polymerization method in order to improve the recovery rate of granular PAS product having a high degree of polymerization.

In other words, this polymerization step, wherein granular PAS is produced by a polymerization reaction between at least one sulfur source selected from the group consisting of an alkali metal sulfide and an alkali metal hydrosulfide and a dihalo aromatic compound in organic amide solvent, is a polymerization step including a polymerization reaction under phase-separated condition, wherein a concentrated polymer phase and a diluted polymer phase are present in combination. This polymerization step is described in detail.

1. Charging Step

The polymerization step may be carried out after the charging step described below. The charging step involves combining the mixture remaining within the system after the dehydration step that is optionally carried out, with dihalo aromatic compound, adding alkali metal hydroxide and water as necessary, to prepare a charged mixture containing organic amide solvent, sulfur source (charged sulfur source), alkali metal hydroxide, water, and dihalo aromatic compound. If the distilled volume of organic amide solvent during the dehydration step is too high, organic amide solvent may be added during the charging step. Furthermore, a sulfur source may also be added during the charging step, in order to adjust the charged sulfur source. In general, because the quantity of each component and the quantitative ratio changes in the dehydration step, adjustment of the quantity of each component in the charging step is required in consideration of the quantity of each component in the mixture obtained in the dehydration step.

The quantity of dihalo aromatic compound used is typically from 0.90 to 1.50 mol, preferably from 0.92 to 1.10 mol, and more preferably from 0.95 to 1.05 mol per 1 mol charged sulfur source. If the mol ratio of charged dihalo aromatic compound to sulfur source is too large, it becomes difficult to produce a high molecular weight polymer. On the other hand, if the mol ratio of charged dihalo aromatic compound to sulfur source is too small, a degradation reaction may occur easily, which may hinder a stable polymerization reaction.

In particular, if alkali metal hydrosulfide is used as the sulfur source, and hydrogen sulfide volatilizes during the dehydration step, alkali metal hydroxide is produced via an equilibrium reaction, which may remain in the system. Accordingly, it is necessary to accurately verify the quantity that will volatilize, and determine the mol ratio of alkali metal hydroxide to sulfur source in the charging step. The total moles of the alkali metal hydroxide produced during dehydration, the alkali metal hydroxide added prior to dehydration, and the alkali metal hydroxide added subsequent to dehydration is preferably within the range of from 1.005 to 1.09 mol, more preferably from 1.01 to 1.08 mol, and particularly preferably from 1.015 to 1.075 mol per 1 mol charged sulfur source (i.e. the sulfur source remaining in the system after the dehydration step); furthermore, it is desirable that the moles of water is adjusted to from 0.01 to 2.0 mol, preferably from 0.05 to 1.8 mol, more preferably from 0.5 to 1.6 mol per 1 mol of charged sulfur source.

In the present invention, the sulfur source used in the charging step is referred to as the "charged sulfur source", in order to distinguish it from the sulfur source used in the dehydration step. The reason for this is that the quantity of sulfur source added to the reaction chamber prior to the dehydration step may vary according to the dehydration step. The charged sulfur source is consumed during the polymerization step by reaction with the dihalo aromatic compound, and the charged sulfur source mol amount is based on the mol amount in the charging step. The volume of charged sulfur source is calculated using the equation [charged sulfur source]=[total mol amount of charged sulfur]−[mol amount of volatized sulfur after dehydration].

If the molar ratio of the alkali metal hydroxide per 1 mol of the charged sulfur source is too large, it may result in increase in alteration of the organic amide solvent, and may induce abnormal reactions or decomposition reactions easily during polymerization. Furthermore, in many cases, the recovery rate and quality of produced PAS will be reduced. It is preferable to perform the polymerization reaction in a state where there is a slight excess of alkali metal hydroxide, so that the polymerization reaction proceeds stably and yields high quality PAS.

In the charging step, the amount of organic amide solvent is typically from 0.1 to 10 kg, preferably from 0.13 to 5 kg, and more preferably from 0.15 to 2 kg, per 1 mol of charged sulfur source.

2. Polymerization Step

In the polymerization step, the charged mixture prepared in the charging step described above is heated typically to a temperature from 170 to 290° C., preferably from 180 to 280° C., and more preferably from 190 to 275° C., to initiate the polymerization reaction and proceed the polymerization. Heating methods include a method in which a fixed temperature is maintained, a method of elevating the temperature in stages or continually, or a combination of both methods. The polymerization reaction time is typically in the range of from 10 minutes to 72 hours, and preferably from 30 minutes to 48 hours. The polymerization reaction is preferably carried out in two steps including a first-stage polymerization step and a second-stage polymerization step, and the polymerization time in this case is the total time of the first-stage polymerization step and the second-stage polymerization step.

The polymerization step includes a polymerization step, in which a polymerization reaction occurs between at least one sulfur source selected from the group consisting of an alkali metal sulfide and an alkali metal hydrosulfide and a dihalo aromatic compound in organic amide solvent, in a phase-separated state with a concentrated polymer phase and a diluted polymer phase being present in the polymerization reaction system in the presence of a phase separation agent. The polymerization reaction proceeds at a temperature of from 170 to 290° C. The phase separation agent is preferably water, as described above, or any compound known to function as a phase separation agent.

Furthermore, in the polymerization step, it is preferable that a polymerization reaction occurs between at least one sulfur source selected from the group consisting of an alkali metal sulfide and an alkali metal hydrosulfide and a dihalo aromatic compound in organic amide solvent at a temperature of from 170 to 270° C., and at the point at which the conversion ratio of the dihalo aromatic compound reaches 30% or greater, a phase separation agent is added to the polymerization reaction mixture so that the phase separation agent is present within the polymerization reaction system, followed by raising the temperature of the polymerization reaction mixture to a temperature from 245 to 290° C., and maintaining the polymerization reaction in a phase-separated state with a concentrated polymer phase and a diluted polymer phase present in the polymerization reaction system in the presence of a phase separation agent.

Furthermore, in the polymerization step, it is preferable that the polymerization reaction is carried out in a two-stage polymerization step: a first-stage polymerization step including a polymerization reaction caused between at least one sulfur source selected from the group consisting of an alkali metal sulfide and an alkali metal hydrosulfide and a dihalo aromatic compound in organic amide solvent, wherein the produced polymer has a conversion ratio of the dihalo aromatic compound of 30% or greater and preferably from 80 to 99%, and a second-stage polymerization step including the polymerization reaction maintained in a phase-separated state with a concentrated polymer phase and a diluted polymer phase present in the polymerization reaction system in the presence of a phase separation agent.

Specifically, in the polymerization step, it is preferable that the polymerization reaction is carried out in an at least two-stage polymerization step: a first-stage polymerization step including a polymerization reaction between at least one sulfur source selected from the group consisting of an alkali metal sulfide and an alkali metal hydrosulfide and a dihalo aromatic compound in organic amide solvent, with from 0.01 to 2.0 mol water being present per 1 mol of charged sulfur source, and the temperature being from 170 to 270° C., wherein the produced polymer has a conversion ratio of the dihalo aromatic compound of from 80 to 99%; and a second-stage polymerization step, including the polymerization reaction maintained in a phase-separated state, with a concentrated polymer phase and a diluted polymer phase present in the polymerization reaction system, by not only adjusting the water content of the polymerization reaction system so that greater than 2.0 mol but 10 mol or less of water per 1 mol of charged sulfur source is present, but also heating to from 245 to 290° C.

The first-stage polymerization step, as described above, is the stage, in which the dihalo aromatic compound conversion ratio reaches from 80 to 99%, preferably from 85 to 98%, and more preferably from 90 to 97% after the start of the polymerization reaction. If the polymerization temperature is too high during the first-stage polymerization step, side reactions and degradation reactions may occur.

The dihalo aromatic compound conversion ratio is the value calculated by the following equation. In the case where the dihalo aromatic compound (hereinafter, also abbreviated as "DHA") is added in excess in terms of the molar ratio in comparison to the sulfur source, the conversion ratio is calculated by the following equation: conversion ratio=[[DHA charged amount (mol)−DHA residual amount (mol)]/[DHA charged amount (mol)−DHA excess amount (mol)]]×100. In other cases, the conversion ratio is calculated by the following equation: conversion ratio= [[DHA charged amount (mol)−DHA residual amount (mol)]/ [DHA charged amount (mol)]]×100.

The coexisting water amount in the reaction system in the first-stage polymerization step is typically within the range of from 0.01 to 2.0 mol, preferably from 0.05 to 1.8 mol, more preferably from 0.5 to 1.6 mol, and particularly preferably from 0.8 to 1.5 mol, per 1 mol of charged sulfur source. The coexisting water amount in the first-stage polymerization step may be small, but if it is too small, undesirable reactions such as degradation of the produced PAS may occur easily. If the coexisting water amount exceeds 2.0 mol, the polymerization speed may decrease dramatically, and degradation of the organic amide solvent or produced PAS may occur easily, neither of which is desirable. The polymerization is carried out in the range of from 170 to 270° C., and preferably from 180 to 265° C. If the polymerization temperature is too low, the rate of polymerization decreases significantly; alternatively, if the temperature is too high, exceeding 270° C., the produced PAS and organic amide solvent tend to degrade, which will significantly reduce the degree of polymerization of the produced PAS.

In the first-stage polymerization step, it is typically preferable to produce a polymer (sometimes referred to as "pre-polymer") having a melt viscosity from 0.5 to 30 Pa·s as measured at a temperature of 310° C., and a shear speed of 1216 sec$^{-1}$.

The second-stage polymerization step is not simply a separating/granulating step for the polymer (pre-polymer) produced during the first-stage polymerization step, but is also intended to increase the degree of polymerization of the polymer.

In the second-stage polymerization step, it is preferable to allow a phase separation agent (polymerization aid) to be present in the polymerization reaction system and to continue the polymerization reaction in a phase-separated state in which a thick phase of the produced polymer and a thin phase of the produced polymer are mixed.

In the second-stage polymerization step, it is particularly preferable to use water as the phase separation agent, and preferable to adjust the amount of water so that there is from greater than 2.0 mol to 10 mol or less, preferably from greater than 2.0 mol to 9 mol or less, more preferably from 2.1 to 8 mol, and particularly preferably from 2.2 to 7 mol of water in the polymerization reaction system per 1 mol of charged sulfur source. In the second-stage polymerization step, if the amount of coexisting water in the polymerization reaction system is 2.0 mol or less or greater than 10 mol per 1 mol of charged sulfur source, the degree of polymerization of the produced PAS may decrease. In particular, it is preferable that the second-stage polymerization step is carried out with the amount of coexisting water in the range of 2.2 to 7 mol, so that PAS with a high degree of polymerization can be obtained.

As an even more preferred manufacturing method, water and another phase separation agent other than water may be used in combination as the phase separation agents in order to perform polymerization with a small amount of phase separation agents. In this aspect, the amount of water in the polymerization reaction system is preferably in the range of from 0.1 to 10 mol, preferably from 0.3 to 10 mol, more preferably from 0.4 to 9 mol, and particularly preferably from 0.5 to 8 mol per 1 mol charged sulfur source, and for the amount of the separation agent other than water is preferably in the range of from 0.01 to 3 mol per 1 mol charged sulfur source. Other phase separation agents preferred for use in combination with water include organic carboxylic acid metal salts, particularly alkali metal carboxylates, and in this case, the amount of water per 1 mol of charged sulfur source is in the range of from 0.5 to 10 mol, preferably from 0.6 to 7 mol, and particularly preferably from 0.8 to 5 mol, while the amount of alkali metal carboxylate is in the range of from 0.001 to 0.7 mol, preferably from 0.02 to 0.6 mol, and particularly preferably from 0.05 to 0.5 mol.

The polymerization temperature in the second-stage polymerization step is in the range of from 245 to 290° C.; if the polymerization temperature is below 245° C., it is difficult to obtain granular PAS with a high degree of polymerization, while if it exceeds 290° C., the granular PAS and organic amide solvent may be degraded. In particular, a temperature range of from 250 to 270° C. is preferred because it yields granular PAS with a high degree of polymerization.

With the objectives of reducing the quantity of byproduct alkali metal salt (for example, NaCl) and impurities included in the produced PAS, and recovering PAS in particle form, water may be added during the last stage of or after the completion of the polymerization reaction, thereby increasing the amount of water. The polymerization reaction may be carried out in batches, continuous mode or a combination of both methods. In batch polymerization, a method using two or more reaction vessels may be used as necessary with the objective of reducing the polymerization cycle time.

3. The Dehydration Step (Optional)

In manufacturing the heat treated fine PAS powder of the present invention, a dehydration step may be carried out prior to the charging step for the polymerization step if desired.

As a step prior to the polymerization step, a dehydration step is preferably carried out to adjust the water content within the reaction system. The dehydration step is preferably carried out in an inert gas environment, by heating a mixture containing organic amide solvent and alkali metal sulfide to promote a reaction, and releasing water from the system by distillation. If alkali metal hydrosulfide is used as the sulfur source, the mixture containing alkali metal hydrosulfide and alkali metal hydroxide is heated to promote a reaction, and water is released from the system by distillation.

In the dehydration step, water including hydrated water (crystal water), aqueous medium, byproduct water, and the like are dehydrated to within the required range.

Furthermore, in the dehydration step, water and organic amide solvent are heated and distilled out by evaporation. Accordingly, the distillate will contain water and organic amide solvent. Part of the distillate may be circulated within the system in order to prevent the release of organic amide solvent outside the system, but in order to adjust the water content, at least part of the distillate containing water must be released outside the system. Upon releasing the distillate outside of the system, a minute quantity of organic amide solvent will be released outside of the system alongside the water.

Furthermore, in the dehydration step, hydrogen sulfide originated from the sulfur source is volatilized. Alongside the release of at least part of the distillate containing water outside of the system, the volatilized hydrogen sulfide is also released outside the system.

During the dehydration step, the coexisting water amount in the polymerization reaction system is dehydrated so that the coexisting water amount is within the range of typically from 0.01 to 2.0 mol, preferably from 0.05 to 1.8 mol, and more preferably from 0.5 to 1.6 mol, per 1 mol of charged sulfur source. As described above, the sulfur source after the dehydration step and before the start of the polymerization step is referred to as the "charged sulfur source". If the amount of water is reduced excessively in the dehydration step, water may be added prior to the polymerization step in order to achieve the desired water content.

When alkali metal hydrosulfide is used as the sulfur source, it is preferable that, in the dehydration step, a mixture containing an organic amide solvent, an alkali metal hydrosulfide, and from 0.9 to 1.1 mol, preferably from 0.91 to 1.08 mol, more preferably from 0.92 to 1.07 mol, and particularly preferably from 0.93 to 1.06 mol, per 1 mol of the alkali metal hydrosulfide, of alkali metal hydroxide is heated and allowed to react, and at least part of the distillate containing water from the system containing the mixture is discharged outside of the system. In many cases, the alkali metal hydrosulfide contains a small amount of an alkali metal sulfide, and the amount of the sulfur source becomes the total amount of the alkali metal hydrosulfide and the alkali metal sulfide. Furthermore, even if a small quantity of alkali metal sulfide is included, the molar ratio in regard to alkali metal hydroxide can be calculated based on the quantity of alkali metal hydrosulfide included (analysis value), and the molar ratio adjusted in the present invention.

If the molar ratio of the alkali metal hydroxide per 1 mol of the alkali metal hydrosulfide in the dehydration step is too small, the amount of the sulfur component (hydrogen sulfide) volatilized in the dehydration step becomes too large, which may cause a reduction in productivity due to a decrease in the amount of the sulfur source or may tend to cause an abnormal reaction or a reduction in the quality of the produced PAS due to an increase in polysulfurized components in the charged sulfur source remaining after dehydration. If the molar ratio of the alkali metal hydroxide per 1 mol of the alkali metal hydrosulfide is too large, it may result in alterations in the organic amide solvent, or hinder stable polymerization reaction, which may in turn lead to a decrease in the yield or quality of the produced PAS.

The charging of each raw material into the reaction vessel in the dehydration step is typically carried out in the temperature range of from room temperature (5 to 35° C.) to 300° C., and preferably from room temperature to 200° C. Any order in which raw materials are introduced can be employed, and furthermore, additional amounts of each raw material may be added during the dehydration process. The solvent used in the dehydration step may be an organic amide solvent. The solvent is preferably the same as the organic amide solvent used in the polymerization step, and NMP is particularly preferred. The amount of the organic amide solvent used is typically approximately from 0.1 to 10 kg per 1 mol of the sulfur source charged in the reaction vessel.

The dehydration operation is carried out by heating the mixture after the raw materials are charged into the reaction vessel, typically at a temperature of not higher than 300° C., and preferably in the temperature range of from 100 to 250° C., typically for 15 minutes to 24 hours, and preferably for 30 minutes to 10 hours. Heating methods include a method in which a fixed temperature is maintained, a method of elevating the temperature in stages or continually, or a combination of both methods. The dehydration step may be carried out in batches, continuous mode or a combination of both.

The device used for the dehydration step may be the same reaction chamber (reaction vessel) as that used in the subsequent polymerization step, or a different one. The device is preferably made of a corrosion-resistant material such as titanium.

Another preferred aspect for producing granular PAS is the method in which the amount is adjusted to allow the formation of separate phases after polymerization has been completed, and cooling is carried out gradually.

III. Separation Step

In the separation step, granular PAS and a separation liquid are separated from a dispersion liquid containing granular PAS, by solid-liquid separation using at least one screen that has an opening diameter of 75 to 180 µm.

The fine PAS powder of the present invention is obtained from the separation liquid obtained by solid-liquid separation as part of the manufacturing method described above to manufacture fine PAS powder, while at the same time, granular PAS is manufactured and recovered from the solids obtained after solid-liquid separation.

Below is an example of the properties of a preferred granular PAS recovered as a product.

The separation recovery process for granular PAS may be carried out, for example, by a separation step using a sieve. In the case where a reaction solution containing the granular PAS produced in the polymerization step is used as the dispersion liquid containing the granular PAS, once the polymerization reaction has been completed, the separation step may be carried out using a sieve to separate and recover granular PAS from a reaction solution containing produced granular PAS, after the product slurry is cooled and diluted with water as necessary.

As previously noted, according to this manufacturing method for granular PAS, granular PAS can be produced. As a result, separation via a sieve with a screen can be employed.

Furthermore, in the case where a reaction solution containing the granular PAS produced in the polymerization step is used as the dispersion liquid containing the granular PAS, the product slurry can be sieved to separate granular PAS at high temperatures, without the need to cool it to room temperature.

The aperture size of the screen used for separation by sieving in the separation step is typically from 75 µm (200 mesh) to 180 µm (80 mesh), and preferably from 90 µm (170 mesh) to 150 µm (100 mesh). At least one screen within this range may be used, or multiple screens may also be used. Typically, a screen with aperture size of 150 µm (100 mesh) is often used.

The recovery rate of granular PAS recovered as product is calculated using the mass of PAS (theoretical amount) as the entire amount of PAS obtained, assuming the whole effective sulfur component within the charged sulfur source present in the reaction vessel after the dehydration step having been converted into PAS.

This recovery rate also depends on the screen aperture size of the sieve, but if at least one screen with an aperture size from 75 µm (200 mesh) to 180 µm (80 mesh) is used, the ratio will typically be 80 mass % or greater, in some cases 83 mass % or greater, and in some cases 85 mass % or greater. The maximum recovery rate is approximately 99.5 mass %.

Furthermore, the average particle size of the obtained granular PAS depends on the sieve screen aperture size, but when at least one screen in the range of 75 µm (200 mesh) to 180 µm (80 mesh) is used, the average particle size is typically from 130 to 1500 μm, preferably from 150 to 1500 μm, and more preferably from 180 to 1500 μm.

The weight average molecular weight of the obtained granular PAS depends on the sieve screen aperture size, but when using at least one screen in the range of 75 μm (200 mesh) to 180 μm (80 mesh), the granular PAS weight average molecular weight will typically be 30000 or greater, preferably 33000 or greater, and more preferably, 35000 or greater. The maximum weight average molecular weight is approximately 90000.

Furthermore, the peak top molecular weight of the granular PAS depends on the sieve screen aperture size, but when using at least one screen in the range of 75 μm (200 mesh) to 180 μm (80 mesh), it will typically be 35000 or greater, preferably 38000 or greater, and more preferably 40000 or greater. The maximum peak top molecular weight is approximately 100000.

The melt viscosity of the obtained granular PAS depends on the sieve screen aperture size, but when using at least one screen in the range of 75 μm (200 mesh) to 180 μm (80 mesh), the granular PAS melt viscosity will typically be 5 Pa·s or greater, preferably 10 Pa·s or greater, and more preferably 15 Pa·s or greater. The maximum melt viscosity is around 500 Pa·s. Melt viscosity is measured using a flat die having a diameter of 1 mm and length of 10 mm as a capillary, at a temperature of 310° C. A polymer sample is inserted in the device, and after the sample is retained there for 5 minutes, melt viscosity is measured at a shear speed of 1216 $sec^{-1}$.

IV. Manufacture (recovery) of Fine PAS Powder From Separation Liquid (IV-1) The separation liquid separated from the granular PAS that is produced in the separation step described above often contains raw material fine PAS powders, byproduct alkali metal salts (NaCl and the like), oligomers, impurities including volatile substances and substances with high boiling point, organic amide solvents, phase separation agents (water and the like), and the like.

That is, the fine PAS powder of the present invention is a fine PAS powder produced from the separation liquid produced in the separation step in which granular PAS and a separation liquid are separated from a dispersion liquid, which contains granular PAS, by solid-liquid separation using at least one screen that has an opening diameter of from 75 to 180 μm.

In an aspect, the fine PAS powder of the present invention is a fine PAS powder obtained by carrying out a solid-liquid separation step in which the separation liquid is subjected to solid-liquid separation to produce a fine PAS powder-containing solid, then carrying out a heating step in which the fine PAS powder-containing solid is heated and an amount of an organic solvent is reduced to produce a wet cake, and then carrying out a washing step in which the wet cake is washed using an aqueous solvent; and the fine PAS powder is useful as a product.

Note that "the separation liquid is subjected to solid-liquid separation to produce a fine PAS powder-containing solid" includes cases where the solid-liquid separation step is carried out directly on the separation liquid, as well as cases where the separation liquid is subjected to the pre-solid-liquid separation step described below and then subjected to the solid-liquid separation step. The solid-liquid separation step, heating step, and washing step are carried out in the following manner.

(i) Solid-liquid Separation Step

The solid-liquid separation step is a step of obtaining the fine PAS powder-containing solid by subjecting the separation liquid to solid-liquid separation. In the solid-liquid separation step, solid-liquid separation may be carried out by filtration, centrifugal separation, sieving, precipitation, or the like. For example, filtration is often carried out, using a filtration device with a typical filter cloth for fine powder. Suction filtration devices are advantageous from the perspective of processing time. In the solid-liquid separation step, the method may be continuous-mode or batch-mode. For a continuous-mode method, a horizontal belt-type filtration device may be used. For a batch-mode method, a filter press is preferable as a filtration device, from the perspective of processing amount if the concentration of the raw material fine PAS powder is low.

The weight average molecular weight of the raw material fine PAS powder of the obtained fine PAS powder-containing solid depends on the sieve screen aperture size, but when using at least one screen having a screen aperture size in the range of 75 μm (200 mesh) to 180 μm (80 mesh), the weight average molecular weight is preferably 15000 or greater, more preferably 18000 or greater, and even more preferably 20000 or greater. The maximum weight average molecular weight is approximately 75000.

Furthermore, the peak top molecular weight of the raw material fine PAS powder of the obtained fine PAS powder-containing solid depends on the sieve screen aperture size, but when using at least one screen having a screen aperture size in the range of 75 μm (200 mesh) to 180 μm (80 mesh), the peak top molecular weight is preferably 30000 or greater, more preferably 33000 or greater, and even more preferably 35000 or greater. The maximum peak top molecular weight is approximately 85000.

The average particle size of the raw material fine PAS powder of the obtained fine PAS powder-containing solid is the value measured using a laser diffraction particle size distribution measuring device, and is preferably from 1 to 80 μm, more preferably from 2 to 80 μm, and even more preferably from 3 to 80 μm.

The melt viscosity of the raw material fine PAS powder of the obtained fine PAS powder-containing solid is preferably 0.2 Pa·s or greater, more preferably 0.6 Pa·s or greater, and even more preferably 1.0 Pa·s or greater. The maximum melt viscosity is approximately 50 Pa·s. The method of measuring melt viscosity is as described above.

(ii) Heating Step

In the heating step, the amount of the organic solvent is reduced by heating the fine PAS powder-containing solid to obtain a wet cake. By reducing the amount of the organic solvent in the fine PAS powder-containing solid in the heating step, the concentration of the organic solvent contained in the waste liquid after the washing step can be effectively reduced. The origin of the organic solvent is not particularly limited, and examples thereof include an organic solvent added in an organic solvent washing step (described below) performed prior to the solid-liquid separation step, and an organic solvent contained in the dispersion liquid containing the granular PAS.

Heat treatment may be carried out using batch-mode or continuous-mode methods. Heat treatment may be carried out using a typical tank-shaped dryer, a rotating tank dryer, an air flow dryer, a fluid bed dryer or other dryers. The fine PAS powder-containing solid may be treated whilst static, but if there is a large quantity of fine PAS powder-containing solid to be heat-treated evenly, it is preferable to make the fine PAS powder-containing solid flow in some way. Examples of the method to heat the fine PAS powder-containing solid while making the fine PAS powder-containing solid flow include a dryer equipped with a fluidized bed, stirrers, paddles, or stirring screws.

The heat treatment may be carried out in an atmosphere of air or low oxygen concentration, or under nitrogen gas, carbon dioxide, steam, or other inert gas. Furthermore, it can be carried out under either regular pressure, reduced pressure, or increased pressure.

The heating temperature is, in average, preferably 85° C. or lower, more preferably from 80° C. to 25° C., and even more preferably from 75° C. to 30° C. The heating temperature is an average temperature during the heating step. When the heating temperature is 85° C. or lower, the fine PAS powder-containing solid is not dried excessively, and wettability of the fine PAS powder is less likely to be reduced because the specific surface area retention, which is a ratio of the specific surface area of the fine PAS powder contained in the wet cake after the heating step relative to the specific surface area of the fine PAS powder contained in the fine PAS powder-containing solid before the heating step, is less likely to be reduced. Furthermore, when the heating temperature is equal to or higher than the lower limit described above, the amount of the organic solvent can be effectively reduced. In the fourth embodiment of the present invention, the heating temperature in the heating step is 85° C. or lower.

The heating time is preferably from 0.3 to 10 hours, more preferably from 0.5 to 6 hours, and even more preferably from 1.0 to 4 hours.

When the heat treatment is carried out under reduced pressure, pressure reduction in the range of 70 to 101 kPa is sufficient.

The water content of the wet cake after the heating step is preferably 30 mass % or greater, more preferably from 33 to 50 mass %, and even more preferably from 35 to 45 mass %. When the water content of the wet cake after the heating step is 30 mass % or greater, wettability of the fine PAS powder is readily sufficiently ensured. When the water content of the wet cake after the heating step is equal to or less than the upper limit described above, handleability of the wet cake is readily enhanced. The method to maintain the water content of the wet cake after the heating step to be within the range described above is not particularly limited, and examples thereof include water addition step (described below) that adds water to the separation liquid after the separation step but before the heating step. The water is preferably added in a form of a water-containing organic solvent (described below). In the first embodiment of the present invention, the water content of the wet cake after the heating step is 30 mass % or greater.

The specific surface area retention A2/A1 of the specific surface area A2 of the fine PAS powder contained in the wet cake after the heating step to the specific surface area A1 of the fine PAS powder contained in the fine PAS powder-containing solid before the heating step is preferably 0.2 or greater (i.e. 20% or greater), more preferably 0.25 or greater (i.e. 25% or greater), and even more preferably 0.3 or greater (i.e. 30% or greater). When the specific surface area retention described above is 20% or greater, space that communicates to the outside is sufficiently present in the inner part of the fine PAS powder contained in the wet cake after the heating step, and thus the aqueous solvent can readily infiltrate. Therefore, in the washing step, impurities such as alkali metal salts and PAS oligomers can be removed readily. Furthermore, the upper limit value of the specific surface area retention is 1 (i.e. 100%). The method to maintain the specific surface area retention to the range described above is not particularly limited, and examples thereof include a method in which the heating temperature in the heating step is set to be lower than the glass transition temperature (Tg) of the PAS. Note that, in the present specification, the specific surface area is measured using the BET method by nitrogen adsorption. In the third embodiment of the present invention, the specific surface area retention A2/A1 is 20% or greater.

(iii) Water Addition Step

The water addition step may be carried out after the separation step but before the heating step. The water addition step is a step of adding water to the separation liquid.

In the water addition step, water in a form of a water-containing organic solvent is preferably added to the separation liquid. Examples of the organic solvent of the water-containing organic solvent include organic solvents having a boiling point that is lower than the boiling point of water, preferably organic solvents that dissolve an organic amide solvent in addition to having the boiling point that is lower than the boiling point of water, more preferably ketone-based solvents, and even more preferably acetone. The water content in the water-containing organic solvent is not particularly limited, and examples thereof include from 20 to 70 mass %, and preferably from 25 to 50 mass %. When the water content is within the range described above, the concentration of the organic solvent is not excessively low and, for example, washing effect by the organic solvent, removal effect of the organic amide solvent, and the like are readily ensured, and wettability of the fine PAS powder is less likely to be reduced even after the heating step is carried out. The water addition step may be carried out as an organic solvent washing step described below. In the second embodiment of the present invention, the water addition step is carried out after the separation step but before the heating step.

(iv) Washing Step

In the washing step, the wet cake is washed by an aqueous solvent. The purpose of this washing step is to reduce the concentration of the alkali metals (e.g., Na concentration) derived from byproduct alkali metal salts in the fine PAS powder, and to reduce the concentration of PAS oligomers in the fine PAS powder.

As the aqueous solvent, for example, water, aqueous solutions of acids such as acetic acid and hydrochloric acid, and aqueous solutions of salts such as acetate are preferred. Water is preferably used.

Filtration may be carried out after the washing step. Filtration may be carried out for the same number of times as washing.

(v) Drying Step

The drying step may be carried out after the washing step. The drying step is a step in which the wet cake that has been washed in the washing step is dried. The drying treatment may be carried out using batch-mode or continuous-mode methods. The drying treatment may be carried out using a typical hot air heat treatment device, a stirred heating device with blades, a fluidized bed heat treatment device, a rotating tank heat treatment device or other heat treatment device. The drying device in the heating step and the heat treatment device in the drying step may be the same device.

In the drying treatment, the wet cake may be treated whilst static, but if there is a large quantity of the wet cake to be dried evenly, it is preferable to make the wet cake flow in some way. Methods of implementing drying treatment while making the wet cake flow include a heat treatment device equipped with a fluidized bed, stirrers, paddles, or stirring screws.

The drying treatment may be carried out in an atmosphere of air or low oxygen concentration, or under nitrogen gas, carbon dioxide, steam, or other inert gas. Furthermore, it can be carried out under either regular pressure, reduced pressure, or increased pressure. The level of pressure reduction is sufficient if in the range of 70 to 101 KPa.

It is beneficial to implement drying treatment under inert gas atmospheric conditions where oxygen is not present, because this results in minimal coloration.

The drying treatment can be carried out at a temperature lower than the melting point of the fine PAS powder, but is carried out preferably at from 100 to 260° C., more preferably at from 120 to 250° C., and even more preferably at from 140 to 240° C. The drying treatment time is typically from 0.5 to 10 hours, preferably from 1 to 8 hours, and more preferably from 2 to 5 hours. The drying treatment may be carried out under reduced pressure conditions.

(IV-2) Furthermore, prior to the solid-liquid separation step, a pre-solid-liquid separation step, an organic solvent washing step, and byproduct alkali metal salt removal step may be implemented.

Pre-solid-liquid Separation Step

The pre-solid-liquid separation step is a solid-liquid separation step that involves using a method of separating the separation liquid into raw material fine PAS powder and filtration liquid, using filtration or another pre-solid-liquid separation method.

Organic Solvent Washing Step

The organic solvent washing step is a step in which acetone and the like may be added to the raw material fine PAS powder to wash away the organic amide solvent and the like included in the raw material fine PAS powder, after which filtration or other separation means may be carried out once again in order to obtain a washed raw material fine PAS powder.

Byproduct Alkali Metal Salt Removal Step

The byproduct alkali metal salt removal step is a step implemented after the pre-solid-liquid separation step in order to dissolve and remove byproduct alkali metal salt from the raw material fine PAS powder by washing with water.

The liquid containing the raw material fine PAS powder after it has been subjected to the pre-solid-liquid separation step, the organic solvent washing step, and the byproduct alkali metal salt removal step as described above has preferably approximately from 0.1 to 15 mass %, more preferably approximately form 0.15 to 10 mass %, and even more preferably approximately from 0.2 to 5 mass %, of the raw material fine PAS powder.

In this case, the preferred filtration separation in the solid-liquid separation step involves filtration using centrifugal filtration and a filter press, in order to obtain raw material fine PAS powder. In this case, the solid substance is recovered in the form of a wet cake.

(IV-3) The fine PAS powder after the washing step is used as a product. Typically, the entire quantity of the fine PPS powder is recovered, but further separation may be carried out with a sieve, allowing the fine PPS powder of a specific particle size or greater to be used. For example, if granular PAS is sieved using a screen having an aperture size of 150 μm (100 mesh), the fine PAS powder obtained from the separation liquid may be sieved with a screen having an aperture size of 75 μm (200 mesh), or the like. However, when the fine PAS powder is sieved using a sieve, the productization yield falls.

V. Fine PAS Powder

In the fifth embodiment, the fine PAS powder of the present invention is a fine PAS powder produced by the manufacturing method according to the present invention.

In the sixth embodiment, the fine PAS powder of the present invention is a fine PAS powder in which the average particle size of the fine PAS powder is from 1 to 200 μm, and the melt viscosity of the fine PAS powder is 1 Pa·s or greater. In the sixth embodiment, the fine PAS powder of the present invention is, for example, produced by the manufacturing method according to the present invention.

In the fine PAS powder of the present invention, impurities such as alkali metal salts and PAS oligomers are reduced.

The fine PAS powder of the present invention may be used, as a product, as a resin composition (compound) after being mixed with granular PAS obtained from the oversize fraction obtained by the separation step described above, which is a conventional product.

The weight average molecular weight of the fine PAS powder of the present invention is preferably 30000 or greater, more preferably 33000 or greater, and even more preferably 35000 or greater. The upper limit of the weight average molecular weight is approximately 90000.

The peak top molecular weight of the fine PAS powder of the present invention is preferably 32000 or greater, more preferably 34000 or greater, and even more preferably 36000 or greater. The maximum peak top molecular weight is approximately 100000.

The melt viscosity of the fine PAS powder of the present invention is preferably from 50% to 150%, more preferably from 55% to 130%, even more preferably from 58% to 120%, and particularly preferably from 65% to 110%, of the melt viscosity of the granular PAS, compared to the melt viscosity of the granular PAS obtained in the separation step. Measurement of melt viscosity is performed as described above.

Furthermore, the melt viscosity is typically 1 Pa·s or greater, preferably 3 Pa·s or greater, more preferably 5 Pa·s or greater, and particularly preferably 10 Pa·s or greater. The maximum melt viscosity is around 500 Pa·s.

The average particle size of the fine PAS powder of the present invention is a value measured by a laser diffraction particle size distribution measuring device and is typically from 1 to 200 μm, preferably from 2 to 100 μm, and more preferably from 3 to 80 μm.

The generated gas may include benzene compound containing sulfur, benzene compound containing halogen, halogenated compound containing nitrogen, organic compounds, and substances with low boiling point containing sulfur.

The alkali metal content of the fine PAS powder of the present invention is preferably 1500 ppm or less, more preferably 1000 ppm or less, and even more preferably 500 ppm or less. The lower limit value is 0 ppm, but practically, it is approximately 10 ppm.

EXAMPLES

Below, the present invention is described in more detail using Manufacturing Examples, Examples, and Comparative Examples. The present invention is not limited by the following examples. In the following Examples and Comparative Examples, unless otherwise stated, "parts" and "%" are by mass.

Below, the measurement methods for each physical property are described.

(1) Recovery Rate of Granular PAS (mass %)

The granular PAS recovery rate was calculated using the mass of PAS (theoretical amount) as the entire amount of PAS, assuming the whole effective sulfur component within the charged sulfur source present in the reaction vessel after the dehydration step having been converted into PAS.

In other words, the granular PAS recovery rate is the mass of recovered granular PAS/mass of PAS (theoretical amount).

(2) Average Particle Size pf Granular PAS

The average particle size of the recovered granular PAS was measured by a sieving method using sieves of mesh #7 (opening diameter: 2800 μm), #12 (opening diameter: 1410 μm), #16 (opening diameter: 1000 μm), #24 (opening diameter: 710 μm), #32 (opening diameter: 500 μm), #60 (opening diameter: 250 μm), #100 (opening diameter: 150 μm), #145 (opening diameter: 105 μm), and #200 (opening diameter: 75

(3) Average Particle Size of Fine PAS Powder

The average particle size of fine PAS powder was measured using a laser diffraction particles size distribution measuring device (SALD, manufactured by Shimadzu Corporation).

(4) Weight Average Molecular Weight, and Peak Top Molecular Weight

The weight average molecular weight (Mw) of PAS was measured using a high temperature gel permeation chromatograph (GPC) SSC-7101, manufactured by Senshu Scientific, Co., Ltd., under the following conditions. Weight average molecular weight, and peak top molecular weight are calculated using polystyrene as the standard.

Solvent: 1-chloronaphthalene,
Temperature: 210° C.
Detector: UV detector (360 nm),
Sample injection amount: 200 μL (concentration: 0.1 mass %)
Flow rate: 0.7 mL/min
Standard polystyrene: five types of standard polystyrenes of 616000, 113000, 26000, 8200, and 600

(5) Melt Viscosity

The melt viscosity was measured with a Capirograph 1-C, manufactured by Toyo Seiki Seisaku-sho, Ltd., using approximately 20 g of a dried product of PAS. At this time, a flat die having a diameter of 1 mm and a length of 10 mm was used as the capillary, and the temperature was set to 310° C. The PAS sample described above was inserted in the device, and after the sample was retained there for 5 minutes, melt viscosity was measured at a shear speed of 1216 $sec^{-1}$.

(6) Na Ion Amount

After the PAS was decomposed in a heated concentrated sulfuric acid, the obtained decomposition product was treated with a hydrogen peroxide solution to prepare a sample solution, and quantity of Na ion of this sample solution was determined by ion chromatography.

(7) Specific Surface Area

The specific surface area of the PAS was measured by the following device and conditions. Note that, when water or the like remained in the PAS, the specific surface area was measured after additional drying of the PAS using a vacuum dryer at room temperature for 24 hours following the drying step.

Instrument: FlowSorb II 2300, manufactured by Shimadzu Corporation
Measurement: Specific surface area was determined using the BET method by nitrogen adsorption
Temperature: Liquid nitrogen temperature (8) Water Content The water content of the wet cake was calculated from the difference in mass of the wet cake before and after the wet cake was dried at 60° C. for 3 hours under reduced pressure (90 kPa) (the difference in mass/mass of wet cake x 100 (%)).

Production Example

Dehydration Step

Into a 20-liter autoclave, 6001 g of NMP, 2000 g of sodium hydrosulfide aqueous solution (NaSH: purity 62 mass %), and 1171 g of sodium hydroxide (NaOH: purity 74.0 mass %) were introduced.

After the inside of the autoclave was purged with nitrogen gas, it was stirred by a stirrer for approximately 4 hours at a rotation speed of 250 rpm, while being heated gradually to 200° C., after which 1014 g of water ($H_2O$), 763 g of NMP, and 12 g of hydrogen sulfide ($H_2S$) were distilled away.

Polymerization Step

After the dehydration step the contents of the autoclave were cooled to 150° C., and 3360 g of pDCB, 2707 g of NMP, 19 g of sodium hydroxide, and 167 g of water were added, before heating to 220° C. and leaving to react for 5 hours to perform the first-stage polymerization step.

The ratio of NMP/charged sulfur source (hereinafter referred to as "charged S") within the vessel (g/mol) was 375, pDCB/charged S (mol/mol) was 1.050, and $H_2O$/charged S (mol/mol) was 1.50.

The pDCB conversion ratio during the first-stage polymerization step was 92%.

After the first-stage polymerization step was completed, the rotation speed of the stirrer was raised to 400 rpm, and 443 g of ion-exchanged water was added to the autoclave while stirring. $H_2O$/ charged S (mol/mol) was 2.63. After the injection of ion-exchanged water, the temperature was raised to 255° C., and the second-stage polymerization step was carried out for 4 hours of reaction.

Separation Step

After the second-stage polymerization step, the mixture was cooled to around room temperature, and the contents were sieved using a screen with an aperture size of 150 μm (100 mesh), to obtain a wet cake of granular PPS on the top of the sieve, and a separation liquid below the sieve.

Subsequently, the granular PPS on the sieve was subjected to typical washing, drying and other recovery steps, and granular PPS was obtained as a product with a recovery rate of 88 mass %. The average particle size was 360 μm, the weight average molecular weight was 42800, and the peak top molecular weight was 51200. Furthermore, the melt viscosity was 35 Pa·s.

Example 1

The separation liquid obtained under the sieve in the separation step in Manufacturing Example 1 was processed as below.

The separation liquid was filtered, and was subjected to pre-solid-liquid separation to separate raw material fine PPS powder and filtration liquid (pre-solid-liquid separation step). The raw material fine PPS powder was washed twice in water-containing acetone having the water content of 50 mass %, and then filtered once again to separate it into a raw material fine PPS powder and a filtration liquid (organic solvent washing step). The raw material fine PPS powder was heated in a dryer at 70° C. in the ambient pressure for 5 hours (water content after the heating: 35 mass %) (heating step). The specific surface area of the raw material fine PPS powder before the heating was 115 $m^2/g$, and the specific surface area of the raw material fine PPS powder after the heating was 89 m²/g. Therefore, the specific surface area retention was 0.77 (i.e. 77%). Then, washing was carried out for several times using distilled water (washing step), and solid-liquid separation was carried out by filtration to obtain a wet cake. The obtained wet cake was dried under reduced pressure (90 kPa) at 60° C. for 3 hours to obtain the fine PPS powder (drying step). The average particle size, melt viscosity, and Na ion amount were measured for this fine PPS powder. As a result, the average particle size was 95 µm, the melt viscosity was 25 Pa·s, and the Na ion amount was 150 ppm. Note that the melt viscosity of the raw material fine PPS powder after the raw material fine PPS powder was sufficiently washed and dried was less than 2 Pa·s.

Example 2

The measurement was performed in the same manner as in Example 1 except for obtaining a fine PPS powder by drying the wet cake under reduced pressure (90 kPa) at 30° C. for 12 hours in the drying step. As a result, the average particle size was 91 um, the melt viscosity was 23 Pa·s, and the Na ion amount was 185 ppm.

Example 3

The measurement was performed in the same manner as in Example 1 except for obtaining a fine PPS powder by drying the wet cake in the ambient pressure at 120° C. for 5 hours in the drying step. As a result, the average particle size was 84 µm, the melt viscosity was 28 Pa·s, and the Na ion amount was 198 ppm.

Example 4

The measurement was performed in the same manner as in Example 1 except for obtaining a fine PPS powder by drying the wet cake in a nitrogen atmosphere at the ambient pressure at 120° C. for 5 hours in the drying step. As a result, the average particle size was 98 µm, the melt viscosity was 24 Pa·s, and the Na ion amount was 170 ppm.

Comparative Example 1

The measurement was performed in the same manner as in Example 1 except for heating the raw material fine PPS powder under reduced pressure (90 kPa) at 140° C. for 12 hours in the heating step. As a result, the average particle size was 88 µm, the melt viscosity was 3 Pa·s, and the Na ion amount was 4500 ppm.

Comparative Example 2

The measurement was performed in the same manner as in Example 1 except for using anhydrous acetone in the organic solvent washing step. As a result, the average particle size was 80 µm, the melt viscosity was 2 Pa·s, and the Na ion amount was 4000 ppm. Furthermore, the specific surface area was 13 m²/g, and the specific surface area retention was 11%.

INDUSTRIAL APPLICABILITY

The fine PAS powder of the present invention can be reused as one component in a compound. The fine PAS powder of the present invention is manufactured from raw material fine PAS powder within the separation liquid that was conventionally disposed and not used, and it is extremely significant that it can now be reused without contaminating the work environment.

The invention claimed is:

1. A method for manufacturing a fine polyarylene sulfide powder, the method comprising:
(a) separating granular polyarylene sulfide and a separation liquid from a dispersion liquid containing granular polyarylene sulfide by solid-liquid separation using at least one screen having an opening diameter in a range of from 75 to 180 µm;
(b) performing solid-liquid separation of the separation liquid, to obtain a fine polyarylene sulfide powder-containing solid;
(c) heating the fine polyarylene sulfide powder-containing solid to reduce an amount of an organic solvent and to obtain a wet cake; and
(d) washing the wet cake using an aqueous solvent;
wherein a water content of the wet cake after heating is 30 wt. % or greater.

2. The manufacturing method according to claim 1, wherein water is added to the separation liquid in a form of a water-containing organic solvent in the step of adding water.

3. A method for manufacturing a fine polyarylene sulfide powder, the method comprising:
(a) separating granular polyarylene sulfide and a separation liquid from a dispersion liquid containing granular polyarylene sulfide by solid-liquid separation using at least one screen having an opening diameter in a range of from 75 to 180 µm;
(b) performing solid-liquid separation of the separation liquid, to obtain a fine polyarylene sulfide powder-containing solid;
(c) heating the fine polyarylene sulfide powder-containing solid to reduce an amount of an organic solvent and to obtain a wet cake; and
(d) washing the wet cake using an aqueous solvent;
wherein a specific surface area retention A2/A1 is 20% or greater, A1 being a specific surface area of the fine polyarylene sulfide powder contained in the fine polyarylene sulfide powder-containing solid before heating and A2 being a specific surface area of the fine polyarylene sulfide powder contained in the wet cake after heating.

4. The manufacturing method according to claim 1, wherein the dispersion liquid containing granular polyarylene sulfide is a reaction solution containing granular polyarylene sulfide produced by performing a polymerization reaction of at least one type of sulfur source selected from the group consisting of alkali metal sulfides and alkali metal hydrosulfides with a dihalo aromatic compound in an organic amide solvent.

5. The manufacturing method according to claim 2, wherein the dispersion liquid containing granular polyarylene sulfide is a reaction solution containing granular polyarylene sulfide produced by performing a polymerization reaction of at least one type of sulfur source selected from the group consisting of alkali metal sulfides and alkali metal hydrosulfides with a dihalo aromatic compound in an organic amide solvent.

6. The manufacturing method according to claim 3, wherein the dispersion liquid containing granular polyarylene sulfide is a reaction solution containing granular polyarylene sulfide produced by performing a polymerization reaction of at least one type of sulfur source selected from the group consisting of alkali metal sulfides and alkali metal hydrosulfides with a dihalo aromatic compound in an organic amide solvent.

* * * * *